United States Patent [19]

Manabe et al.

[11] 4,108,288
[45] Aug. 22, 1978

[54] CURRENT COLLECTOR SHOE SUSPENSION FOR EXTERNALLY POWERED ELECTRIC VEHICLE

[75] Inventors: Katsushi Manabe, Tokyo; Fumio Nakama, Musashino; Kunio Shibayama, Kobe, all of Japan

[73] Assignees: Fuji Electric Co., Ltd., Kawasaki; Japanese National Railways, Tokyo, both of Japan

[21] Appl. No.: 813,384

[22] Filed: Jul. 6, 1977

[30] Foreign Application Priority Data

Jul. 6, 1976 [JP] Japan .................................. 51-80101
Jul. 6, 1976 [JP] Japan .................................. 51-80102

[51] Int. Cl.² .............................................. B60L 5/38
[52] U.S. Cl. ........................................ 191/49; 191/58; 191/59.1
[58] Field of Search ..................... 191/49, 50, 55, 57, 191/58, 59.1, 62, 65; 246/65; 310/13; 339/22 T

[56] References Cited

U.S. PATENT DOCUMENTS

1,728,819    9/1929    Bower .................................... 191/58

FOREIGN PATENT DOCUMENTS

483,881    10/1929    Fed. Rep. of Germany ............ 191/49

*Primary Examiner*—Trygve M. Blix
*Assistant Examiner*—Reinhard J. Eisenzopf
*Attorney, Agent, or Firm*—Sughrue, Rothwell, Mion, Zinn and Macpeak

[57] ABSTRACT

A current collector shoe suspension for sliding contact with an electric power line in an externally powered electric vehicle. Current collecting shoes are resiliently biased toward a power rail through a plurality of interconnected vibration absorbing units pivotally mounted to the vehicle. Each unit can vibrate independently of the others, and the units have different resonance points so displaced that their vibration characteristic curves overlap, whereby the shoes maintain contact with the rail over a wide range of vibration frequencies and amplitudes.

6 Claims, 6 Drawing Figures

CURRENT COLLECTOR SHOE SUSPENSION FOR EXTERNALLY POWERED ELECTRIC VEHICLE

BACKGROUND OF THE INVENTION

1. Field of the Invention

This invention relates to a current collector shoe suspension for an externally powered electric vehicle wherein the shoes maintain sliding contact with a power rail over a wide range of vibration frequencies and amplitudes.

2. Description of the Prior Art

Conventional sliding shoe current collectors are generally biased against an electric power rail through a single vibration absorbing unit, an no problems occur as long as the collector or user vehicle speed is relatively low. When the collector speed becomes higher, however, the frequency of the forced mechanical vibrations generated by minute uneven portions on the sliding surface of the power rail correspondingly increases. The current collector shoes cannot respond to or follow such high frequency vibrations due to their inertia however, whereby they have a tendency to lose contact with the power rail which considerably degrades the vehicle performance and causes undue power loss, contact arcing and wear problems, etc.

SUMMARY OF THE INVENTION

It is therefore an object of the present invention to provide a sliding shoe current collector suspension capable of maintaining close and continuous contact with a power rail over a wider and higher speed range than the prior art current collector suspensions.

This object is attained by a current collector suspension so constructed that the sliding shoes are resiliently urged toward and into contact with an electric power rail through a plurality of interconnected vibration absorbing units pivotally mounted on the support base of an electrically driven vehicle. Each unit can vibrate independently from the others, and the units have different resonant frequencies so displaced that their vibration characteristic curves overlap.

DETAILED DESCRIPTION OF THE PREFERRED EMBODIMENTS

Figure 1:
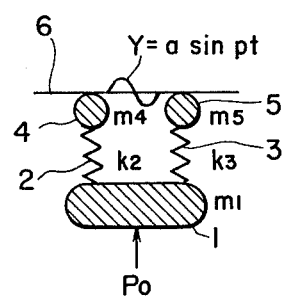
FIG. 1 shows a sectional schematic view of a current collector shoe suspension according to a first embodiment of the invention.

In FIG. 1, reference numeral 1 designates a support base on a mass $m_1$, which resiliently supports current collector shoes 4 and 5 of masses $m_4$ and $m_5$ through springs 2 and 3 having spring constants $k_2$ and $k_3$. To the support base 1, a predetermined pressure $Po$ is applied from a running body (not shown) such as an electric car, thereby bringing the current collector shoes 4 and 5 into contact with a power line 6 for feeding electric power to the running body. The combinations of the current collector shoes 4 and 5 and the corresponding springs 2 and 3 constitute two independent elemental mass-spring type vibration absorbing units.

According to the above construction, the current collector shoes 4 and 5 can mechanically vibrate independently from each other relative to the support base 1. Additionally, since the masses of the current collector shoes 4 and 5 are small in comparison with that of the support base, the inertia of the two collector shoes becomes small, thus enabling them to follow high frequency mechanical vibrations of the power line 6. For this reason, the mechanical vibration frequency following range of the overall current collector becomes broader.

Next, the vibration following characteristics of each current collector shoe 4 or 5 for the case where the electric power line 6 is mechanically vibrated according to $y = a \sin pt$ (wherein $a$ designates a vibration amplitude, and $p$ denotes an angular vibration frequency) will be considered. The maximum vibration amplitude $a_o$ at which the current collector shoe 4 can follow the power line 6 without losing contact therewith when a forced mechanical vibration of frequency $p$ is applied to the collector shoe 4, can be expressed as follows:

$$a_o = \frac{p_o}{\frac{k_2^2}{m_1 p^2 - k_2} - m_4 p^2 + k_2} \tag{1}$$

As is evident from equation (1), the maximum vibration amplitude $a_o$ is a function of the forced vibration frequency $p$, and the current collector shoe 4 can allow the movement of the power line 6 without losing contact therewith within a given forced vibration frequency range when the amplitude $a_o$ is greater than the amplitude $a$ of the actual forced vibration.

Figure 2:
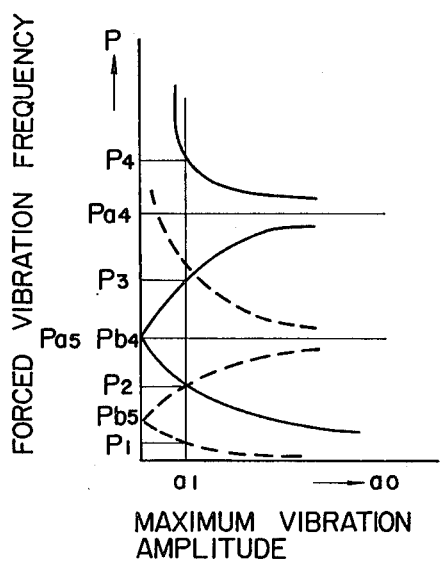
FIG. 2 shows a plot of the mechanical vibration characteristics of the current collector shoe suspension of FIG. 1.

The relation between the amplitude $a_o$ and the frequency $p$ of the forced vibration is illustrated by the solid curves in FIG. 2, wherein the amplitude $a_o$ is taken along the abscissa and the forced vibration frequency $p$ is taken along the ordinate.

As will be apparent from FIG. 2, there are two resonance points in this mechanical vibration system, one making the amplitude $a_o$ infinity and the other making it zero. The resonance frequencies $Pa_4$ and $Pb_4$ are expressed as follows:

$$Pa_4 = \sqrt{\frac{k_2}{m_1}}, \quad Pb_4 = \sqrt{\frac{(m_1 + m_4) k_2}{m_1 m_4}}$$

In the case where only a single vibration absorbing unit including, e.g., the current collector shoe 4 is used, there is the unavoidable disadvantage that the current collector shoe cannot follow the power line 6 at the resonance point $Pb_4$ where the amplitude $a_o$ is brought to zero. The current collector shoe suspension of the invention is provided with at least two vibration absorbing units each having a current collector shoe, however. More particularly, in the embodiment of FIG. 1, the constants ($m_5$, $k_3$) of a second vibration absorbing unit including the current collector shoe 5 and the spring 3 are made different from those ($m_4$, $k_2$) of the first vibration absorbing unit such that the resonance points $Pa_5$ (resonance amplitude becomes infinity) and $Pb_5$ (resonance amplitude becomes zero) of the former are displaced from the resonance points $Pa_4$ and $Pb_4$ of the latter, and the resonance point $Pa_5$ substantially coincides with the resonance point $Pb_4$. In FIG. 2, the vibration following characteristics of the first unit are indicated by solid lines and those of the second unit are shown by dotted lines.

As will be apparent from FIG. 2, assuming the maximum vibration amplitude of the power line 6 is $a_1$, in a vibration frequency range between $p_2$ and $p_3$ close to the response point $Pb_4$ where the current collector shoe 4 cannot follow the vibration of the power line, the current collector shoe 5 can follow the vibration. Likewise, in a vibration frequency range between $p_1$ and $p_2$ where the current collector shoe 5 cannot follow the vibration of the power line, it can be followed by the current collector shoe 4. Accordingly, throughout the entire vibration frequency range between $p_1$ and $p_4$, one of the current collector shoes 4 and 5 can always follow the vibration of the power line 6, whereby the overall current collecting unit of the invention can always trace or follow the power line vibrations without losing contact therewith and in consequence attain very stable and positive current collection.

Figure 3:
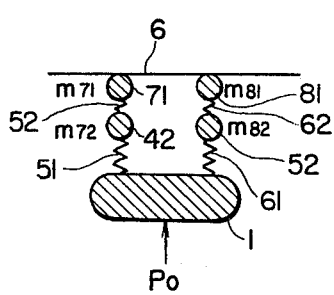
FIG. 3 shows a sectional schematic view of a current collector shoe suspension according to a second embodiment of the invention.
Figure 4:
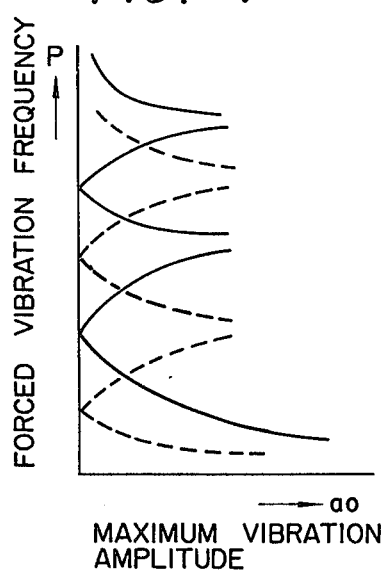
FIG. 4 shows a plot of the mechanical vibration characteristics of the current collector shoe suspension of FIG. 3.

Furthermore, in order to improve the vibration following characteristics of the current collect or shoe suspension of the invention in higher speed ranges, the mass $m_4$ or $m_5$ of each current collector shoe 4 or 5 in FIG. 1 may be divided into two or more masses ($m_{71}$, $m_{72}$ or $m_{81}$, $m_{82}$) as shown in FIG. 3, with each of the masses connected in series through respective springs (51, 52 or 61, 62) so that three or more independent elemental mass-spring type vibration absorbing units are constituted. In this construction, the masses $m_{71}$ and $m_{81}$ of the current collector shoes 71 and 81 directly contacting the power line 6 are made smaller than those of FIG. 1, whereby the response of the collector shoes 71 and 81 to mechanical vibrations of the power line is increased and their contact capabilities in higher speed ranges are further improved. The vibration following characteristics of the current collector shoes 71 and 81 are indicated in FIG. 4 by solid lines and dotted lines, respectively, in the same manner as in FIG. 2.

Figure 5:
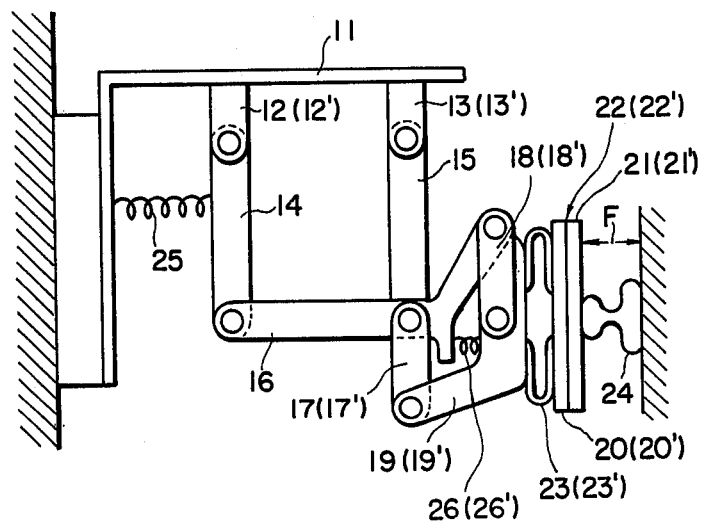
FIGS. 5 and 6 are front and side views, respectively, of a practical current collector shoe suspension constructed in accordance with the invention.
Figure 6:
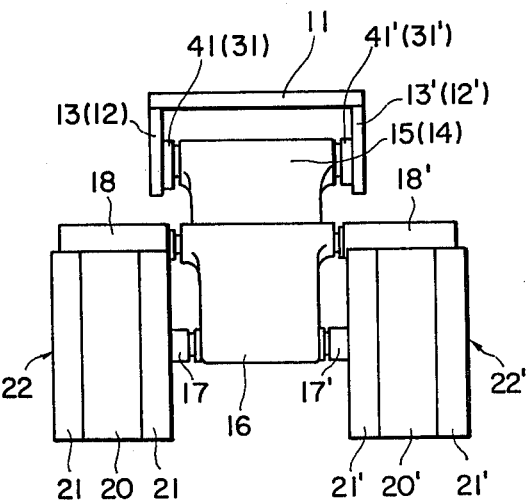

FIGS. 5 and 6 are front and side views of a practical shoe type current collector suspension constructed in accordance with the invention. Reference numeral 11 designates a base member secured to a running body such as an electric car or the like, numerals 12, 12' and 13, 13' designate support members provided on the base member 11 for rotatably supporting the one ends of a pair of parallel extending main links 14 and 15 through junctions 31, 41 and 31', 41', and numeral 16 denotes a movable arm connected between the other ends of the main links 14 and 15. The arm 16 is L-shaped having a portion extending from the connection point with the main link 15 bent upwardly. To this connection point and the upwardly bent end of the arm 16 the one ends of two pairs of auxiliary links 17, 18 and 17', 18', which extend in parallel, are pivotally connected. Each pair of auxiliary links is independently movable, and their other ends are pivotally connected to L-shaped support arms 19, 19'. Current collector shoes 22, 22' in the form of slide plates mounted on supporting members 20, 20' are secured to the support arms 19, 19', via leaf springs 23, 23'. The slide plates 21, 21' are brought into contact with a power rail 24 extending along the track of the electric car or the like. A first compression spring 25 is disposed between the base member 11 and the main link 14 for urging the main links 14, 15 toward the power rail 24, and second compression springs 26, 26' are disposed between the movable arm 16 and the support arms 19, 19' for urging the pairs of auxiliary links 17, 17' and 18, 18' toward the power rail.

In the above arrangement the spring constants $K_{25}$, $K_{26}$, $k_{26}'$ and $K_{23}$, $K_{23}'$ of the springs 25, 26, 26' and 23, 23' are selected as follows:

$$K_{25} < K_{26}, K_{26}' < K_{23}, K_{23}'.$$

Thus, the deflections are greatest for spring 25, intermediate for springs 26, 26', and least for springs 23, 23'.

As a result, the auxiliary links 17, 18 and 17', 18' are, within the range of deflection of the springs 26, 26', movable independently from the main links 14 and 15, and the current collector shoes 22 and 22' are, within the range of deflection of the leaf springs 23, 23', movable independently from the auxiliary links 17, 18 and 17', 18'.

According to the present invention, the main links 14, 15, auxiliary links 17, 18 and 17', 18', and the collector shoes 22, 22' are mutually connected in series through the corresponding springs, and the entire mass of the current collector shoe suspension is thus divided into three parts constituting three independent elemental mass-spring type vibration absorbing units. The mass of the first vibration absorbing unit which comprises the current collector shoes 22, 22' and the springs 23, 23' has a comparatively small value, and the spring constants $K_{23}$, $K_{23}'$ have a comparatively large value. Accordingly, the first vibration absorbing unit has the highest resonant frequency and exhibits good response to high frequency forced mechanical vibrations from outside. The mass of the second vibration absorbing unit which includes the auxiliary links 17, 18 and 17', 18' and the springs 26, 26' is equal to the mass of these elements plus the mass of the first vibration absorbing unit. Therefore, the second vibration absorbing unit has a lower resonant frequency that that of the first vibration absorbing unit. Likewise, the mass of the third vibration absorbing unit which comprises the main links 14, 15 and the spring 25 is equal to the mass of the entire current collector shoe suspension, and in consequence the third vibration absorbing unit has a lower resonant frequency than that of the second vibration absorbing unit.

The current collector shoes 22, 22' are urged by the spring 25 toward the power rail 24 at a predetermined pressure through the main links 14, 15 and the auxiliary links 17, 18 and 17', 18', and are thus brought into contact with the rail. When an external force indicated in FIG. 5 by an arrow F is applied to the current collector shoe due to the change in the relative position between the current collector shoe and the power rail, the springs 25, 26, 26' and 23, 23' are deflected to dampen or absorb such force, thereby enabling the current collector shoes 22, 22' to follow the movement of the power rail without losing contact therewith. Since the main links 14, 15 and the auxiliary links 17, 18 and 17', 18' are moved in parallel in a transverse or lateral direction with respect to the rail 24, and the movable arm 16 and support arms 19, 19' are moved in parallel in a vertical or perpendicular direction with respect to the rail, the current collector shoes 22, 22' are always held in contact with the rail at a substantially constant angle and without any inclination, If the mechanical vibration frequency due to the external force becomes higher, the third and second vibration absorbing units can respectively vibrate independently from the first vibration absorbing unit, so that they can absorb external forces having vibration frequencies lower than their resonant frequencies. For this reason, even under the application of a high frequency forced vibration due to minute uneven portions on the surface of the power rail or the like, the current collector shoes according to the invention can maintain good contact with the power rail and attain stable current collection up to considerably high speeds.

In the embodiment of FIGS. 5 and 6, although the current collector shoes 22, 22' are resiliently supported by the arms 19, 19' via the leaf springs 23, 23', the latter may be omitted in some applications. Moreover, the connecting arrangement between the movable arm 16 and the auxiliary links 17, 18 and 17', 18' is not necessarily limited to the specific configuration shown. With the disclosed arrangement common connecting pins can be used, however, which economizes the number of required parts. Additionally, the formation of the movable arm 15 and the support arms 19, 19' into L-shapes reduces the overall length of the current collector shoe suspension and hence contributes to miniaturization.

Furthermore, although two auxiliary links have been provided on both sides of the movable arm 16, the number thereof may be one. By the provision of a plurality of auxiliary links, however, each including a current collector shoe, it is possible to provide different mechanical vibration absorbing characteristics for each pad mounting whereby the rail following capability of the overall current collector shoe suspension is improved.

What we claim is:

1. In a sliding current collector shoe suspension for an externally powered electric vehicle including at least one current collector with a vibration absorbing assembly pivotally mounted between a current collector shoe and the vehicle for resiliently biasing the shoe toward and into sliding contact with an electric power supply rail, the improvement characterized by: said current collector comprising a plurality of said current collector shoes individually mounted on a common support frame of the vehicle through a like plurality of interconnected vibration absorbing units, each such unit being capable of vibrating independently and said units having different natural resonant frequencies so mutually displaced that their respective vibration characteristic curves overlap.

2. A sliding current collector suspension as defined in claim 1, wherein said plurality of vibration absorbing units comprises a pair of parallel main linkage arms (14, 15) having their one ends pivotally mounted at spaced points to a support member (11) of the vehicle; a connector arm (16) pivotally coupled to the other ends of the main linkage arms and extending therebeyond; at least one pair of parallel auxiliary linkage arms (17, 18) having their one ends pivotally mounted at spaced points to the connector arm; a support arm (19) mounting said current collector shoe and pivotally coupled to the other ends of the auxiliary linkage arms; a first resilient member (25) biasing the main linkage arms toward the electric power supply rail; and a second resilient member (26) biasing the auxiliary linkage arms toward the electric power supply rail.

3. A sliding current collector suspension as defined in claim 2, further comprising a third resilient member (23) interposed between the support arm and the current collector shoe.

4. A sliding current collector suspension as defined in claim 2, wherein the connector arm and the support arm are substantially L-shaped.

5. A sliding current collector suspension as defined in claim 2, wherein one end of at least one of the auxiliary linkage arms is pivotally mounted to be coupling point of the connector arm and one of the main linkage arms by a common pin.

6. A sliding current collector suspension as defined in claim 1, wherein there are at least two vibration absorbing units each having a zero amplitude resonant frequency and an infinite amplitude resonant frequency, and wherein the zero amplitude resonant frequency of one of said units substantially corresponds to the infinite amplitude resonant frequency of the other of said units.

* * * * *